Jan. 21, 1964   P. L. BRAINARD ETAL   3,118,554
VACUUM HANDLING APPARATUS
Filed March 23, 1959   2 Sheets-Sheet 1

INVENTORS.
PAUL L. BRAINARD
JAMES R. AARON
BY
BUCKHORN, CHEATHAM & BLORE
ATTORNEYS

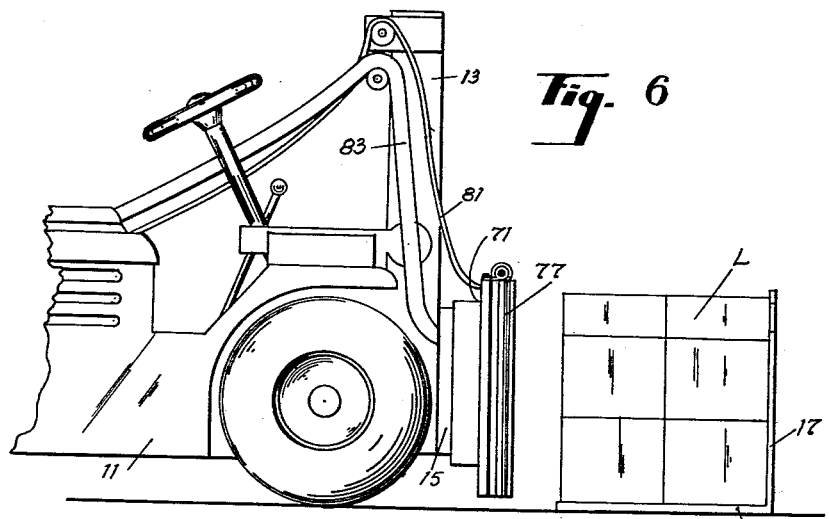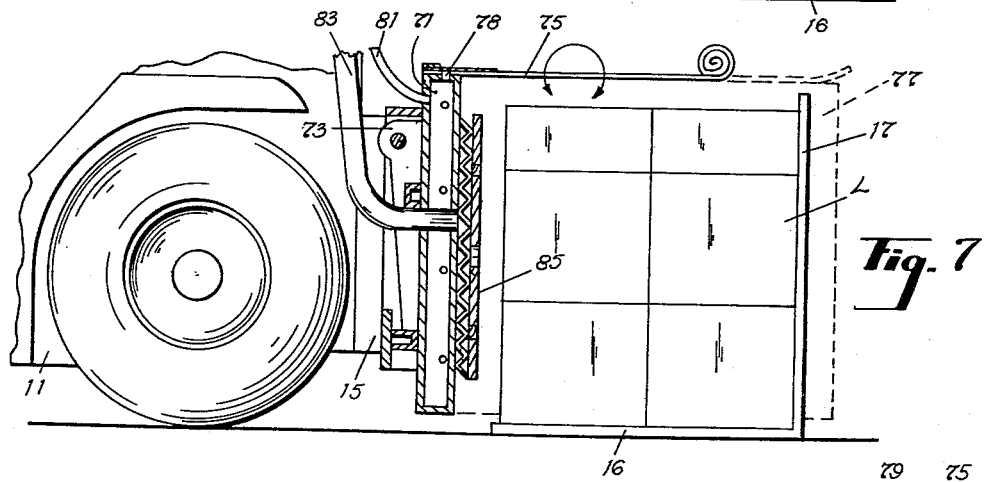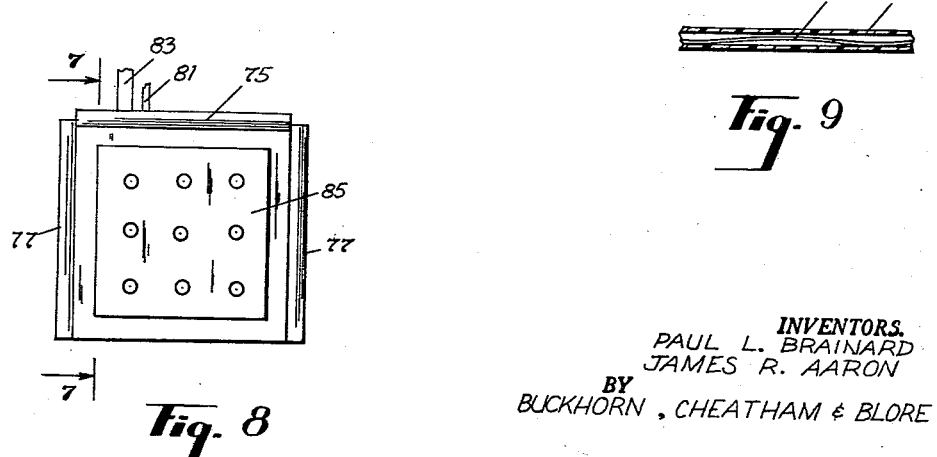

United States Patent Office 3,118,554
Patented Jan. 21, 1964

3,118,554
VACUUM HANDLING APPARATUS
Paul L. Brainard and James R. Aaron, Portland, Oreg., assignors to Hyster Company, Portland, Oreg., a corporation of Nevada
Filed Mar. 23, 1959, Ser. No. 801,224
10 Claims. (Cl. 214—651)

This invention relates to methods and apparatus for handling loads and particularly to vacuum methods and apparatus for handling loads, and also to certain articles of commerce produced by such methods. The present application concerns the general subject matter disclosed in co-pending applications Serial No. 761,218, entitled "Method and Apparatus for Handling Loads," now Patent No. 3,040,920, and Serial No. 782,269, entitled "Handling Methods and Apparatus," now Patent No. 3,054,521.

In application Serial No. 782,269, there is disclosed a vacuum type load handling apparatus in the form of an industrial lift truck having a load enclosing curtain unit provided with a top section, two side sections, a rear section, and having an open front to enable the curtain unit to move over a load resting on a sheetlike pallet. There is a rolled up front curtain which is then moved to a position covering the open front of the curtain unit to completely enclose the load. A subatmospheric pressure is then created within the load space to enable the load and pallet to be picked up.

It is a main object of the present invention to provide an apparatus basically similar to that just described, but which does not require the movable front curtain, or in fact, any front curtain. Specifically, it is an object of the invention to provide such an apparatus in which the load rests on a pallet having an upstanding section which functions when the curtain unit is disposed in embracing relationship with respect to the load to close the front of the curtain unit so that the load will be completely enclosed by the curtain unit and the pallet.

It is an important object of the invention to provide a load handling apparatus comprising a hollow container which is separable into two units to enclose a load, one unit being supported by the carriage, wherein each unit has a plurality of angularly related wall portions with the wall portions of the units being in sealing engagement with one another in the load enclosing positions of the unit, there being means for withdrawing air from the container to create a differential pressure forcing the units toward one another to facilitate picking up a load.

The apparatus of my prior application referred to above, projects forwardly of the lift truck when carrying the load and also when empty. In some cases, this forward projection in the empty condition is objectionable because it limits the maneuverability of the truck in narrow aisles and the like. In other installations, however, such forward projection is of no importance.

It is a main object of the present invention to provide an apparatus of the type basically similar to the above mentioned apparatus, but which does not project forwardly of the truck in its empty condition, but is capable of projecting forwardly of the truck to embrace a load. More specifically, it is an object of the invention to provide such an apparatus having side and top flexible sections which are rollable into compacted condition adjacent the front of the truck or are extendable to positions to embrace a load.

Various other objects of the invention will be apparent from the following description taken in connection with the acompanying drawings wherein:

FIG. 6 is a side view in elevation of a modified form of load handling apparatus shown next to a load;

FIG. 7 is a vertical section on an enlarged scale of the load handling apparatus taken along line 7—7 of FIG. 8, showing one flexible member partly extended;

FIG. 8 is a front view of the apparatus disclosed in FIG. 6 with the flexible members in their contracted positions, the scale being the same as in FIG. 6;

FIG. 9 is a fragmentary sectional view through a flexible member to better show its construction.

Figure 1:
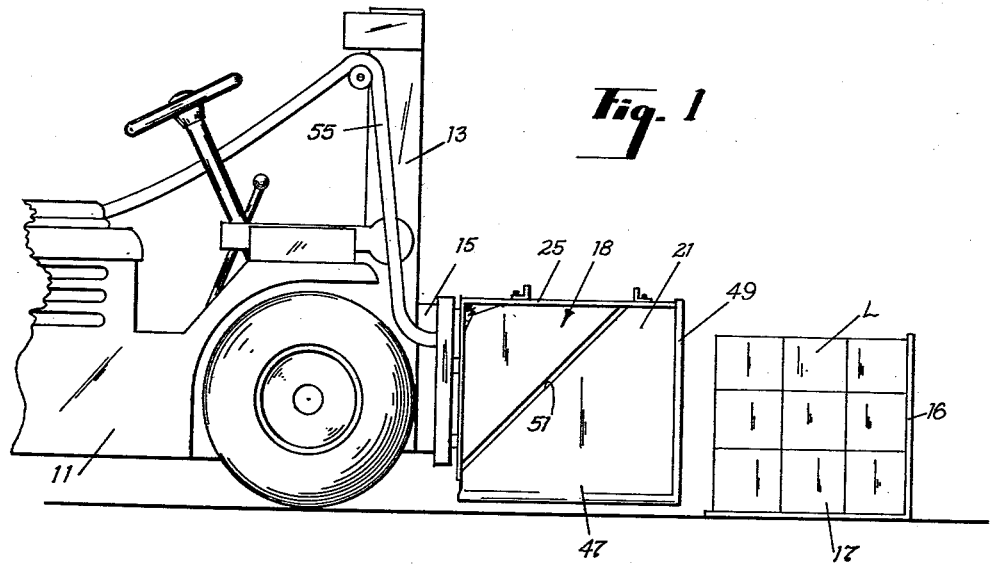
FIG. 1 is a side view in elevation of a load handling apparatus embodying the concepts of the present invention showing it approaching a load.

Referring to FIG. 1, there is disclosed an industrial lift truck of generally conventional form including a body 11 having a mast 13 at its forward end. A load carriage generally entitled 15 is movable along the mast under the influence of a hydraulic ram, not disclosed. The attachment at the front end of the truck is basically the same attachment disclosed in FIGS. 1 through 5 of application Serial No. 782,269, with the exception that the present attachment does not include a front curtain as does the form of the invention in such application. Instead, the function of the front curtain is performed by an upstanding section or wall 16 of a pallet which includes a base section or wall 17 on which the load L rests. The walls 16 and 17 are impervious or substantially impervious to air and are joined by a joint which is impervious or substantially impervious to air. That is to say, the attachment includes as a first member or unit a curtain unit generally entitled 18 having a rear section or wall 19, a top section or wall 20 and two side sections of walls 21, which together with the second member of unit in the form of the pallet 16, 17 entirely enclose the load L when the curtain unit 18 is arranged in embracing relationship with respect to the load. Further mention of this will be presently made.

A brief description of the attachment will now be given. The attachment includes a support member for the curtain unit 18, the support member including a vertical rigid backplate 23 and a horizontal rigid top plate 25. A pair of rearwardly projecting mounting pieces 27 receive a mounting bar 29 supported by the carriage 15. The backplate carries a bumper 31 to rest against a lower crosspiece 33 of the carriage.

Figures 2, 3:
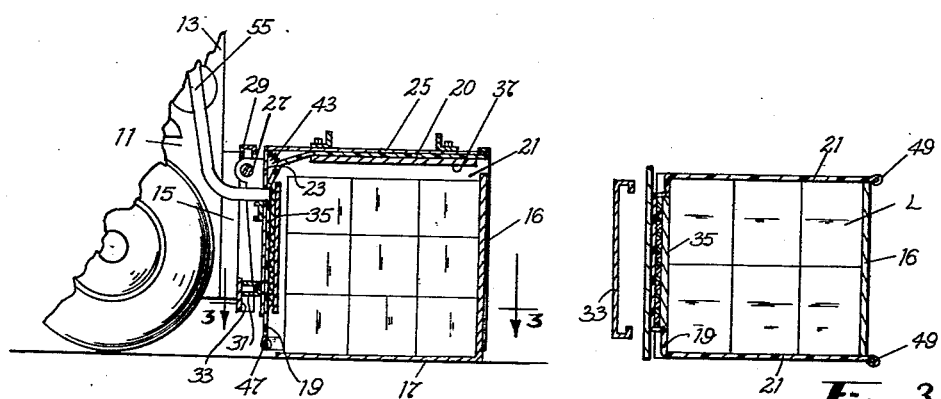
FIG. 2 is a view in longitudinal section of the load handling apparatus of FIG. 1, showing the load in an embraced condition.
FIG. 3 is a horizontal section taken along line 3—3 of FIG. 2.

Referring to FIG. 2, a load engaging plate assembly 35, similar to that disclosed in said application Serial No. 782,269, is mounted on the backplate and a similar load engaging plate assembly 37 is mounted on the underside of the top plate. As indicated in application Serial No. 782,269 the attachment may be provided with only one support plate and its plate assembly if the capacity of the attachment is sufficient to handle the particular loads to be picked up.

The portion of the curtain unit 18 between the back section 19 of the curtain and the top secetion 20 of the curtain is loose and connected by suitable springs 43 as in the previous form of the invention and for similar purposes. The corresponding side portions of the curtain unit are similarly connected.

The lower edges of the side curtains sections 21 are weighted as at 47 and the forward edges of the side sections 21 are made somewhat form-sustaining as indicated at 49 and as shown in said application, Serial No. 782,269. Suitable braces 51, one of which is shown in FIG. 1 connect the top and backplates.

In operation, the truck is maneuvered to bring the curtain unit 18 into embracing relationship with respect to the load L as shown in FIG. 2. Continued forward movement of the attachment and lowering movement of the attachment will bring the load-engaging plate assemblies 35 and 37 into engagement with the load.

Air is thereafter withdrawn by means of a hose 55 to create a subatmospheric pressure within the load space defined by the curtain unit 18 and the pallet 16, 17 to provide an ambient pressure forcing the sections or walls of the curtain into firm engagement with the load and also forcing the load and the pallet against the plate assemblies 35 and 37.

It is apparent from FIGS. 2 and 3 that the vertical edges of the upright pallet section 16 will be disposed in contiguous relationship to the forward margins of the side curtain sections 21 when the parts are arranged in the FIG. 3 position, and the lower edges of the side sections 21 and the lower edge of the rear curtain section 19 will be disposed in contiguous relationship with respect to similar edges of the base section 17 of the pallet. Thus the various adjacent portions of the curtain unit and the pallet will be disposed or forced into sealing engagement or contact by the subatmospheric pressure created within the load space so that the load is disposed within a substantially airtight enclosure. It is not necessary that the enclosure be entirely airtight, since the capactiy of the vacuum pump or blower connected to the hose 55 can be sufficient to maintain a desired partial vacuum within the enclosure despite leakage.

Figure 4:
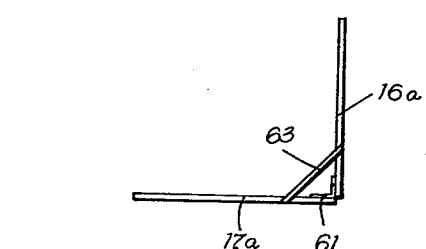
FIG. 4 is a side view of a modified form of pallet.
Figure 5:
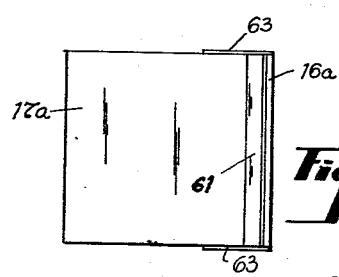
FIG. 5 is a top view of the pallet disclosed in FIG. 4.

FIG. 4 shows a modified form of pallet including a base section 17a and an upright section 16a connected by a hinge 61 and also by flexible bracing straps 63. The hinge and bracing straps enable the upright section 16a to fold downwardly against the base section 17a so that the pallet may assume a compact form for convenient storage or transportation. The pallet may also assume the form of a piece of ordinary cardboard folded intermediate its length to provide a portion upon which a load may be placed, and a portion to lie against one side of the load to be detachably held in place such as by tape. In any event, the joint between the walls or sections 16a and 17a is impervious or substantially impervious to air.

It is apparent from the above description that the present invention has provided a load handling apparatus or device including a hollow container for the carriage or other moving structure, the container being separable into two units to enclose a load, one unit being supported by the carriage, each unit having a plurality of angularly related wall portions, the wall portions of the units sealingly engaging one another in the load enclosing position of the units, there being means for withdrawing air from the container to create a differential pressure forcing the units toward one another. The units of course are impervious or substantially impervious to air.

Second Form of Apparatus

In FIGS. 6 through 9, the load L is mounted on a pallet 16, 17 of the same type disclosed in FIG. 1. However, in this form of the invention, the load engaging attachment does not have forwardly projecting flexible curtain sections of the same type disclosed in FIG. 1. Instead, the attachment includes a generally flat, rigid, vertical manifold 71 having mounting pieces 73 for mounting on the load carriage 15. A top flexible curtain member 75 and two side flexible members 77 are provided. Each of these flexible members is of hollow form and is secured at its rear end to the manifold 71. Each such member is provided with openings at its rear end communicating with opening 78 in the manifold to be supplied with air under pressure at the desired time.

Each hollow flexible member also contains one or more coil springs 79 which urge the respective flexible members to assume a rolled up form as shown in FIG. 6. However, the flexible members can be caused to flatten out or unroll when air is supplied through a suitable hose 81 to the manifold 71 and thence to the flexible members.

When the flexible members are unrolled, they form a three-sided, flexible curtain for embracing the load L on the pallet 16, 17. It is apparent from FIG. 8 that the upper margins of the side flexible members 77 are disposed in slightly overlapping relationship with respect to the side edges of the top flexible member. Also, the forward and lower edges of the curtain members are disposed in continuous overlapping relation with respect to the side edges of the pallet 16, 17 in the extended position of the curtain members. It is thus apparent that the various opposed portions of the flexible curtain members and the pallet 16, 17 will be brought into sealing engagement when air is withdrawn through a hose 83 to create a subatmospheric pressure within the load space defined by the flexible curtain members and the pallet 16, 17. The ambient pressure created by the subatmospheric pressure forces the load tightly against a load engaging plate assembly 85 similar to that disclosed in the first form of the invention. Thus the load may be readily picked up without imposing any of the lifting strain on the flexible members 75 or 77. After the load is deposited, the air pressure can be reduced in the manifold 71 to allow the curtain members to roll up under the influence of the coil springs 79. This means that the truck may now be readily maneuvered in narrow aisles without interference by any forwardly projecting curtain members.

Having described the invention in what is considered to be the preferred embodiment thereof, it is desired that it be understood that the invention is not to be limited other than by the provisions of the following claims.

We claim:

1. A load lifting apparatus comprising an attachment for an industrial lift truck, said attachment including a curtain unit having a rear section, a top section and flexible side sections defining a load space, a load support having a bottom section on which the load may rest and an upright section, means for moving the curtain unit and load support relative to one another so that the curtain unit embraces the load on the load support from a direction remote from said upright section of the load support and disposes the forward edges of the curtain unit in contacting relation with respect to the side and top edges of the upright section of the load support, and means for connecting a source of vacuum to the space defined by the curtain unit and load support to create a subatmospheric pressure within said space to enable the load to be lifted.

2. A load lifting apparatus comprising an attachment for an industrial lift truck, said attachment including a curtain unit having a rear section, a top section and flexible side sections defining a load space, said curtain unit having an open front and bottom, a load support having a bottom section on which the load may rest and an upright section, said bottom section being of a size to approximately span the open bottom of said curtain unit, said upright section being of a size to approximately span the front of said unit so that when said unit is disposed in embracing relationship with respect to a load on said support said load will be enclosed on all sides, and means for connecting a source of vacuum to the space defined by the curtain unit and load support to create a subatmospheric pressure within said space to enable the load to be lifted.

3. A load lifting apparatus comprising an attachment for an industrial lift truck, said attachment including a multisided enclosing means defining a three dimensional load space for accommodating a load and for at least partially enclosing a load to be lifted, at least one side of said means comprising a hollow flexible member, and means urging said member to assume a rolled-up shape, and means for conducting air under pressure to the interior of said member to cause it to unroll for enclosing purposes.

4. A load lifting apparatus comprising an attachment for an industrial lift truck, said attachment including a multisided enclosing means defining a load for accommodating and at least partially enclosing a load to be lifted, at least one side of said means comprising a hollow flexible enclosing member, means urging said member to assume a rolled-up shape, means for conducting air under pressure to the interior of said member to cause it to unroll for enclosing purposes, and means for connecting a source of vacuum to the load space defined by said enclosing means.

5. A load lifting apparatus comprising an attachment for an industrial lift truck, said attachment including a multisided enclosing means defining a three dimensional load space to accommodate and to at least partially enclose a load to be lifted, at least three sides of said means each comprising a hollow flexible member, means for causing the three members to assume a rolled-up shape, means for conducting air under pressure to the interior of said members, to cause them to unroll for enclosing purposes, two of said members being disposed in spaced parallel relation, the other member spanning the space between said two members, and suction means for creating a suction within the load space defined by said enclosing members.

6. In a lift truck having a mast and a load carriage movable vertically along said mast,
load enclosing means for said carriage comprising:
a first unit having a rear wall, a top wall, and side walls defining a load space,
a second unit having a bottom wall and an angularly related upright wall,
at least one of such units being supported by said carriage,
said bottom wall being adapted to receive a load,
means for moving said units relatively to one another so that said first unit embraces the load on said second unit,
the edge portions of the walls of at least one unit being in sealing contact with portions of the other unit in the embraced conditions of said units,
said units being at least substantially impervious to air,
and means for connecting a source of vacuum to the space defined by said units to create a subatmospheric pressure within said space to unitize the units and load to enable them to be handled as a unit.

7. In a lift truck having a mast and a load carriage movable vertically along said mast,
load enclosing means for said carriage comprising a hollow container,
said container comprising two units which are separable to enclose a load,
one unit being supported by said carriage,
each unit having a plurality of angularly related wall portions,
the wall portions of said units sealingly engaging one another in the load enclosing positions of said units,
said units being at least substantially impervious to air,
and means for withdrawing air from said container to create a differential pressure forcing said units toward one another.

8. A load lifting apparatus for the vertically movable carriage of an industrial lift truck,
said lifting apparatus including a first unit having a rear wall, a top wall and side walls defining a load space,
said first unit having an open front and bottom,
a second unit having a bottom wall on which the load may rest and an upright wall,
said bottom wall being of a size to span the open bottom of said first unit,
said upright wall being of a size to span the front of said first unit so that when said first unit is disposed in embracing relationship with respect to a load on said second unit, said load will be enclosed on all sides, the wall portions of said units sealingly engaging one another in the load enclosing positions of said units,
said units being at least substantially impervious to air,
one unit being supported by said carriage,
and means for connecting a source of vacuum to the space defined by said units to create a subatmospheric pressure within such space to unitize the units and load to be lifted upon elevation of said carriage.

9. In a lift truck having a mast and a load carriage movable vertically along said mast,
a hollow rectangular six-sided structure to receive a load,
said structure being separable into two units, one of which has two angularly related sides and the other of which has the remaining sides of said structure, at least one of said units being supported by said carriage,
the edges of at least one unit being in contiguous sealing relation to portions of the other unit when said structure is assembled about a load,
and means for connecting a source of subatmospheric pressure to the interior of said structure to create a differential pressure forcing said units toward one another.

10. In a lift truck having a mast and a load carriage movable along said mast,
a hollow multi-sided structure to enclose a load,
said structure being separable into two units, each of which has a plurality of angularly related wall portions, at least one of such units being carried by said carriage,
the edges of at least one unit being in contiguous sealing relation to portions of the other unit in the enclosing positions of said units,
and means for connecting a source of subatmospheric pressure to the interior of said structure to create a differential pressure forcing said units toward one another.

References Cited in the file of this patent

UNITED STATES PATENTS

| | | |
|---|---|---|
| 1,970,193 | Riebel | Aug. 14, 1934 |
| 2,061,495 | Woodruff | Nov. 17, 1936 |
| 2,119,300 | Spanel | May 31, 1938 |
| 2,359,406 | Crosser | Oct. 3, 1944 |
| 2,423,358 | Wheaton | July 1, 1947 |
| 2,471,693 | Lilienfeld | May 31, 1949 |
| 2,576,322 | Waters | Nov. 27, 1951 |
| 2,612,260 | Schoenhut | Sept. 30, 1952 |
| 2,676,722 | Ulinski | Apr. 27, 1954 |
| 2,700,632 | Ackerland | Jan. 25, 1955 |
| 2,708,046 | Cushman | May 10, 1955 |
| 2,710,105 | Schwartz | June 7, 1955 |
| 2,716,497 | Wahl et al. | Aug. 30, 1955 |
| 2,764,859 | Hanselmann | Oct. 2, 1956 |
| 2,815,309 | Ganahal | Dec. 3, 1957 |
| 2,893,581 | Cushman | July 7, 1959 |
| 2,897,995 | Farrar | Aug. 4, 1959 |
| 3,054,521 | Harris et al. | Sept. 18, 1962 |